United States Patent [19]

Harris

[11] Patent Number: 4,840,800
[45] Date of Patent: Jun. 20, 1989

[54] SOYBEAN FIBER IN INSECT REARING MEDIA

[76] Inventor: Robert L. Harris, 2704 Broadmoor, Bryan, Tex. 77802

[21] Appl. No.: 121,161

[22] Filed: Nov. 16, 1987

[51] Int. Cl.⁴ .............................................. A23K 1/00
[52] U.S. Cl. ...................................... 426/2; 426/573; 426/634; 426/454; 119/6
[58] Field of Search .................... 426/634, 2, 570, 573, 426/431, 558, 454; 119/6

[56] References Cited

U.S. PATENT DOCUMENTS

| | | | |
|---|---|---|---|
| 3,275,446 | 9/1966 | Hamamura et al. | 119/6 |
| 3,488,196 | 6/1970 | Niimura et al. | 426/2 |
| 3,583,871 | 6/1971 | Niimura et al. | 119/6 |
| 4,181,747 | 1/1980 | Kickle | 426/431 |
| 4,304,768 | 12/1981 | Staub et al. | 426/558 |
| 4,341,807 | 7/1982 | Turbak et al. | 426/570 |
| 4,378,381 | 3/1983 | Turbak et al. | 426/573 |

OTHER PUBLICATIONS

"Fi-Pro® F 200 Soy Fiber Product Data Sheet", Grain Processing Corporation, Muscatine, Iowa, published 09/02/86.

*Primary Examiner*—R. B. Penland
*Attorney, Agent, or Firm*—Neal J. Mosely

[57] ABSTRACT

Insect larvae of a variety of types are raised successfully on a feed containing a variety of nutrient ingredients admixed with a small amount of soybean solids as a gelling agent and nutrient. The soybean solids are present in the amount of 5–20% by weight of the final gel composition. The nutrient composition may also be provided as a solid mixture which is formed into a gel on addition of water, the soybean solids being present in the desired proportion in the final gel composition.

4 Claims, No Drawings

SOYBEAN FIBER IN INSECT REARING MEDIA

BACKGROUND OF THE INVENTION

1. Field of the Invention

This invention relates generally to insect rearing media and specifically to the use of soybean fiber therein.

2. Brief Description of the Prior Art

Insect larvae are usually reared on a variety of nutrients in an aqueous solution solidified by the use of agar, carrageenan, other plant gums and fiber, or synthetic fibers. However, these products do not contain nutrients that can be utilized by the insects. Some of the products are not satisfactory as they break down and allow the media to liquefy. Others dry out to rapidly and provide an unsatisfactory media for the insect larvae. Others are only soluble in hot water. There still remains a need for an improved solidifying agent that also provides nutrients and is soluble in cold water. While soybean meal is known as an ingredient of nutrient media for larvae, the use of soybean fiber as a gelling agent and nutrient ingredient is not reported in the literature or patents.

"Artificial diets for insects, mites, and spiders" IFI/-Plenum, New York, New York, 594pp (1977), Singh discloses a variety of insect diets, not including the diets disclosed and claimed herein.

Masazumi Niimura et al U.S. Pat. No. 3,583,871 discloses an artificial feed for silkworms comprising maize and/or sorghum with more than 50% soy bean solids compounded as a gel.

Masazumi Niimura et al U.S. Pat. No. 3,488,196 discloses an artificial feed for silkworms comprising mulberry leaf compounded with 20-60% protein on a dry weight basis.

Homare Miyazawa et al U.S. Pat. No. 3,465,720 discloses an artificial feed for silkworms provided in a sealed bag where the silkworms are grown under controlled humidity, temperature and carbon dioxide content.

SUMMARY OF THE INVENTION

One of the objects of this invention is to provide new and improved insect rearing media.

Another object of the invention is to provide insect rearing media in a gel form containing 5-20% soybean fiber as a gelling agent and nutrient.

Another object of the invention is to provide insect rearing media in a solid form capable of forming a gel on addition of water and containing soybean fiber as a gelling agent and nutrient in an amount equal to 5-20% of the gel after addition of water.

Other objects of the invention will become apparent from time to time throughout the specification and claims as hereinafter related.

DESCRIPTION OF THE PREFERRED EMBODIMENTS

In accordance with the present invention soybean fiber when added to all classifications of insect larval rearing media by absorbing water will solidify media and provide nutrients, specifically protein and minerals. Soybean fiber is commercially available and is obtained by processing defatted soy flakes and is primarily composed of soybean cotyledons cell wall structures. A typical analysis of the product is 32-36% protein, <0.5% fat, 5% ash, 45-55% fiber, 5-10% other carbohydrates, and 6% moisture however the percentage of protein can be as low as 12% and the percentage of fiber can as high as 75%. The rearing media are usually indexed by weight of nutrient containing products such as proteinaceous and/or carbonaceous concentrates (yeast, casein, blood, egg, milk, gluten, wheat germ, starch, sugar, etc.), vitamins and minerals. Nutrients will vary according to species being reared but usually cotains about 3 to 20% protein, 2 to 20% carbohydrates, less than 1% fat, 1 to 3% minerals, 1 to 10% fiber, less than 1% vitamins and the remainder water. Various preservatives are used in insect larval rearing media to prevent decomposition. Agar, carrageenan, plant gums or other water absorbent materials are used to solidify otherwise liquid media, as insect larvae usually require rearing media containing from 70 to 90% water.

In the preparation of commercial insect larval rearing media the ingredients are milled, blended, and mixed with water. For such media soybean seed fiber is blended with the basic dry ingredients before blending with water. When in the media the amount of soybean seed fiber ranges from about 5% to 20% by weight of the finished media, preferably as low a concentration as to effectively maintain the consistency and nutrient level of the media.

The following examples are not intended to limit the scope of the invention but will more clearly illustrate its best mode of operation.

EXAMPLE 1

A standard media presently used for rearing Heliothis sp. (Order:Lepidoptera) larvae contains the following ingredients was blended and was utilized as the control.

| CONTROL | |
|---|---|
| Dried pinto beans | 10% |
| Wheat germ | 4.5% |
| Brewers yeast | 3% |
| Ascorbic acid | <1% |
| Preservatives | <1% |
| Agar | 1% |
| Water | 80.5% |

The soybean fiber media test formulas were:

| | Test Media 1 | Test Media 2 |
|---|---|---|
| Soybean fiber | 14% | 10% |
| Wheat germ | 5% | 5% |
| Brewers yeast | 3% | 3% |
| Ascorbic acid | <1% | <1% |
| Preservatives | <1% | <1% |
| Water | 75% | 80% |

The dry ingredients, except agar, for the control diet were mixed with ½ the water in a high speed blender. The remainder of the water was heated to dissolve the agar. The agar-water mixture was then blended with the other ingredients in the high speed blender. About 10g of the media was dispensed into a 4 dram vials.

After the media cooled and solidified two or more Heliothis sp. larvae were added to each vial. The vials were plugged with cotton, inverted, and held at 24'C for larval development. Pupae were removed and weighed three weeks later. The test media was prepared by mixing all the dry ingredients then blended by hand with cold water. The media was then dispensed into vials, infested with larvae and held in the same manner as the control. Preservatives in all media contained methylparaben, sorbic acid, formalin, fumidil and aureomycin.

| RESULTS EXAMPLE 1 | | | |
|---|---|---|---|
| MEDIA | NUMBER VIALS | NUMBER PUPAE | % PUPA-TION | WEIGHT/ PUPAE (mg) |
| Test media 1 | 12 | 7 | 58 | 437 |
| Test media 2 | 12 | 8 | 67 | 394 |
| Control | 5 | 2 | 40 | 445 |

EXAMPLE 2

Control diet was the same as example 1. Soybean seed fiber test media were:

| | Test media 3 | Test media 4 |
|---|---|---|
| Soybean fiber | 14% | 10% |
| Wheat germ | 5% | 7% |
| Sugar | 4% | 0 |
| Corn gluten | 0 | 5% |
| Vitamin mix | 0.5% | 0.5% |
| Ascorbic acid | <1% | <1% |
| Preservatives | <1% | <1% |
| Water | 76% | 76% |

Mixing procedure was the same as in example 1. Vitamin mix contained pantothenate-cal, nicotinic acid, riboflavin, folic acid, thiamin, pyridoxine, d-biotin, B-12, and choline chloride.

| RESULTS EXAMPLE 2 | | | |
|---|---|---|---|
| Media | NUMBER VIALS | NUMBER PUPAE | % PUPA-TION | WEIGHT/ PUPAE (mg) |
| Control | 8 | 2 | 25 | 455 |
| Test media 3 | 10 | 9 | 90 | 476 |
| Test media 4 | 8 | 7 | 88 | 488 |

EXAMPLE 3

No control media was used. Soybean seed fiber media were:

| | Test media 5 | Test media 6 |
|---|---|---|
| Soybean fiber | 14% | 10% |
| Wheat germ | 5% | 7% |
| Vitamin mix | 1% | 1% |
| Ascorbic acid | <1% | <1% |
| Preservatives | <1% | <1% |
| Water | 79% | 81% |

| RESULTS EXAMPLE 3 | | | |
|---|---|---|---|
| Media | NUMBER VIALS | NUMBER PUPAE | % PUPA-TION | WEIGHT/ PUPAE (mg) |
| Test media 5 | 94 | 78 | 83 | 454 |
| Test media 6 | 65 | 59 | 91 | 457 |

EXAMPLE 4

Two hundred grams of a mixture of 15% soybean fiber and 85% water was exposed to a natural infestation of various diptera. As the media began to decay it attracted at least two species which oviposited on the media. Over 100 of Fannia sp. (Order:Diptera) larvae successfully completed larval development and pupated. A second batch (200g) of media exposed to natural infestations yielded ten Sarcophagidae pupae (Order:Diptera).

EXAMPLE 5

Examples of other insects that can be reared on the media with only minor variations and additions include but are not limited to:

| | |
|---|---|
| Anthonomus spp | Agrotis spp |
| Conotrachelus spp | Pseudaletra spp |
| Lucilia spp | Spodoptera spp |
| Phormia spp | Trichophlusia spp |
| Drosophila spp | Laspeyresia spp |
| Pectinophora spp | Manduca spp |
| Lymantria spp | Bombyx spp |

EXAMPLE 6

In a blend of dry ingredients suitable for mixing with water for use as insect larval rearing media, the dry ingredients consist of about 5% to 60% by of protein and 0 to 60% by weight carbohydrates from concentrates, and mixtures thereof. The improvement comprises adding from 30% to 100% soybean fiber to provide nutrients and to solidify the media when mixed with water. An example of the dry formulation is as follows:

Insect rearing media was pressed into known weight tablets. The tablets were subsequently being placed into the insect rearing containers an a selected amount of water added sufficient to form a nutrient gel. When the media had absorbed the water, Heliothis larvae were placed on the media for development.

In one case, a 1.7 g. tablet of a dry mix which contained 65.4% soybean fiber, 28% wheat germ, 4.7% Vitamin mix, and 1.9% preservatives was placed in a 4 dram vial and 6 ml. water added. Two hours later, the insect larvae were placed on the media and held for development. A total of ten larvae were reared on the tablet formulation.

The results of these examples are quite striking as the test diets produced more Heliothis sp.pupae that were heavier than the control. The percent survival in the test media ranged from 58 to 90% whereas the survival on the control media was 25 and 40%. The test diets produced larger pupae when a vitamin mix was used as a vitamin source rather than brewers yeast. Results of example 3 show that large numbers of larvae can be consistently reared on the improved media. The moths have been reared for three generations on various combinations of the test diet. Example 4 demonstrates the wide range of insects that can be reared on the soybean fiber media. The test diets were also easier to mix as they were mixed with cold water and a blender was not required.

While this invention has been described fully and completely with special emphasis on several preferred embodiments, it should be understood that within the scope of the appended claims this invention may be practiced otherwise than as specifically described herein.

I claim:

1. In an improved insect larval rearing media comprising nutritionally balanced feed ingredients including about 0 to 12% by weight proteinaceous and/or carbonaceous concentrates, 0 to 1% vitamins, <1% preservatives and 70 to 80% water and mixtures thereof:

the improvement consisting essentially of 5% to 20% soybean fiber to provide nutrients and to solidify the media when mixed with cold water.

2. The product in claim 1 wherein the amount of soybean fiber is 10%.

3. The product in claim 1 wherein the amount soybean fiber is 14%.

4. In an improved method of making an insect larval media manufactured by blending nutritionally balanced amounts of dry ingredients selected from group consisting of carbonaceous and/or proteinaceous ingredients, vitamin supplements, preservatives and mixtures thereof, and tableting the ingredients before adding cold water: the improvement comprising:

adding to the ingredients, prior to tableting about 65% soybean fiber by weight of the dry mixture; whereby the media is solidified when cold water is added.

* * * * *